Feb. 18, 1958 C. B. EBERMAN ET AL 2,823,938
COUPLING FOR ROCK DRILL RODS
Filed July 3, 1952
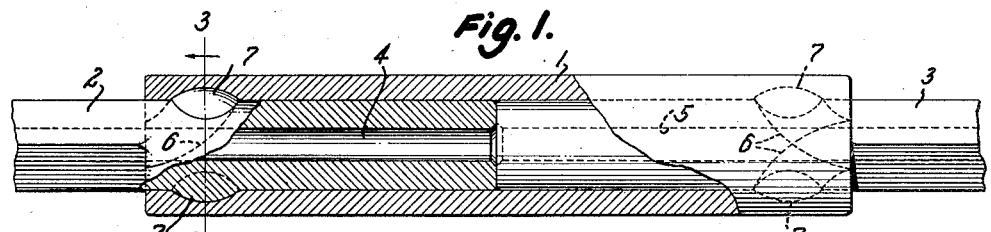
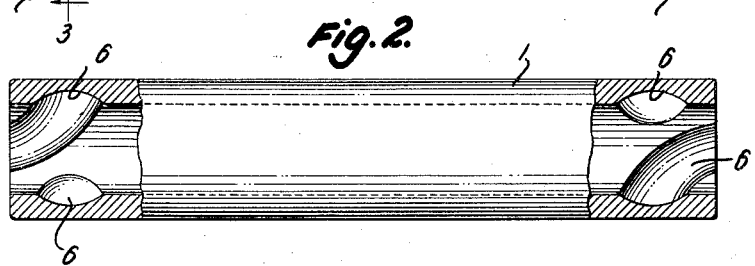
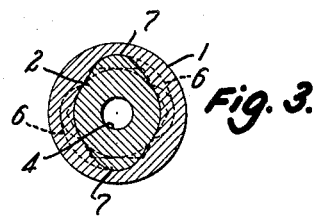
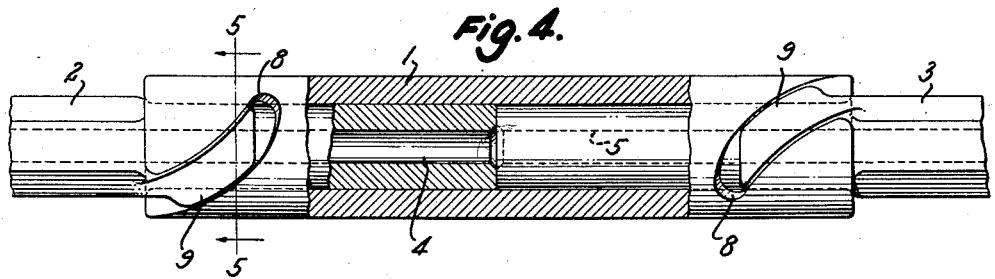
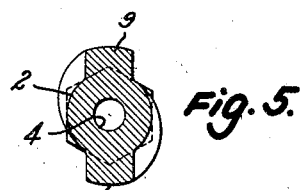
INVENTORS
Carl Börje Eberman
Didrik Wilhelm Haglund
Otto Julius Waldemar Tenland
BY Pierce, Scheffler & Parker
their ATTORNEYS

United States Patent Office 2,823,938
Patented Feb. 18, 1958

2,823,938

COUPLING FOR ROCK DRILL RODS

Carl Börje Eberman, Didrik Wilhelm Haglund, and Otto Julius Waldemar Tenland, Sandviken, Sweden, assignors to Sandvikens Jernverks Aktiebolag, Sandviken, Sweden, a corporation of Sweden Application July 3, 1952, Serial No. 297,132

Claims priority, application Sweden July 13, 1951

4 Claims. (Cl. 287—117)

This invention relates to a rock drill rod section coupling. The term "drill rod section" as used herein embraces not only the drill rod sections but also the drill bit.

Drill rod couplings are subjected to severe strains in the use of the drill. Each coupling must serve to secure the ends of the rod sections together against both longitudinal and rotary relative movement and must further provide a relatively fluid-tight connection to assure the passage of liquid through the bore in the rod sections and bit to the point of contact of the bit with the rock being drilled.

Heretofore drill rod sections have been connected by means of an internally threaded sleeve which cooperates with external threads on the ends of the rod sections. This type of coupling has the defect that cracks and breaks frequently occur in the threaded portions presumably due to the fact that the threads give rise to weakness in the metal or set up excessive strains which initiate the formation of cracks in the metal. Threaded couplings have continued to exhibit this tendency to develop cracks in spite of attempts to overcome the tendency by varying the shape and depth of the threads. Cracks and ruptures occur most frequently in the region of the adjacent ends of the rod sections presumably due to the fact that some bending of the sleeve occurs in this region.

An object of the present invention is to provide a coupling in which cracks and ruptures are avoided while retaining the advantages of the threaded-sleeve type of coupling, i. e. its simplicity and low cost, its ease of coupling and uncoupling, its fluid-tightness and in fact also its strength, disregarding cracks or ruptures, which apparently occur not as a result of a single stress or strain but only as a result of repeated shocks as the drill strikes the rock.

In accordance with the present invention the cracking is avoided by the elimination of threads adjacent the ends of the rod sections and in the sleeve adjacent the contacting ends of the rod sections and further by the use of threads elsewhere in the sleeve and on the rod sections having a pitch of at least 30°. The unthreaded portion of the sleeve adjacent the contacting ends of the rod sections and between the threaded ends of the sleeve should occupy at least one-seventh and preferably from one-fourth to three-fourths of the total length of the sleeve. Due to the fact that the surfaces of the drill rod sections adjacent the contacting ends thereof and the corresponding portion of the sleeve surface where cracks generally occur are smooth, the strains or weakness incident to the presence of threads do not occur and cracking is avoided.

Two illustrative embodiments of the invention are shown in the accompanying drawings in which:

Fig. 1 is an elevation, partly in section of a coupling in which internal threads are positioned exclusively adjacent the ends of the sleeve and on corresponding portions of the drill rod sections;

Fig. 2 is an elevation of the coupling sleeve in section adjacent the ends to reveal the threads;

Fig. 3 is a cross-section on the line 3—3 of Fig. 1;

Fig. 4 is an elevation, partly in section of a coupling in which the threads are in the form of slots extending through the wall of the sleeve; and Fig. 5 is a cross-section on the line 5—5 of Fig. 4, but omits the sleeve.

In the embodiment shown in Figs. 1, 2 and 3, 1 is the sleeve, 2 and 3 are the drill rod sections, 4 and 5 are the passageways through the drill rod sections, 6 are helicoidal grooves extending outwardly from the otherwise cylindrical inner surface of the sleeve and 7 are threads extending outwardly from the otherwise cylindrical outer surfaces of the drill rod sections. As shown, the grooves 6 and the threads 7 are short, extending only about one-fourth of the distance around the circumferences of the sleeve and are relatively wide and deep so as to provide the necessary strength. As stated above, the grooves and threads are at a pitch greater than 30°. The grooves and threads are confined to zones near the ends of the sleeve and to corresponding zones on the rod sections amounting together to only about one-fifth of the length of the sleeve. The grooves and threads may, however, be extended to occupy a greater portion of the length of the sleeve and a greater portion of its circumference, i. e. they may occupy as much as six-sevenths of the length of the sleeve and may each extend to the full circumference of the sleeve, leaving only one-seventh of the length of the sleeve adjacent the middle thereof unthreaded. The size and shape of the grooves and threads may be varied but in general coarse threads and shapes which avoid sharp angles, are preferred. In a coupling having a sleeve about 18 centimeters in length and about 2.25 centimeters internal diameter the threads should occupy not less than about 5 centimeters nor more than about 16 centimeters of the length of the sleeve.

In the embodiment illustrated in Figs. 4 and 5, the sleeve 1 is provided with slots 8 which, as illustrated, extend about one-third of the circumference of the sleeve and like the grooves 6 in the embodiment of Figs. 1–3 have a pitch angle of at least 30°. Also like the grooves 6, the slots 8 may extend a less or greater distance along the length and around the circumference of the sleeve but in any event should not extend nearer than one centimeter to the contacting ends of the rod sections 2 and 3. They may occupy, for instance, from about one-seventh to about six-sevenths of the length of the sleeve and preferably from one-fifth to four-fifths. The slots 8 are relatively wide to receive the correspondingly thick threads 9 on the rod sections 2 and 3. The edges of the slots 8 and particularly at the inner ends preferably are rounded so as to avoid sharp edges and angles which appear to be the starting points of cracks. In both embodiments two threads are illustrated but there may be only a single thread or on the other hand, more than two.

The principal accomplishment of the present invention is that it avoids the presence of threads, grooves or other irregularity in the smooth surfaces of the rod sections and the sleeve in the immediate vicinity of the contacting ends of the rod sections. A further accomplishment is that the coupling has adequate strength and the parts are readily connected and disconnected.

We claim:

1. A percussion rock drill coupling comprising a sleeve having a cylindrical bore of uniform cross-section with helicoidal grooves in its inner surface adjacent its opposite ends and axially spaced from the middle of the length thereof, and cylindrical rod sections having substantially plane ends at right angles to the longitudinal axes thereof and having helicoidal ridges on their outer surfaces axially spaced from said plane ends, said ridges matching said grooves and being spaced from said plane ends a distance substantially equal to the distance of said grooves from the middle of said sleeve so that the plane ends of said rod sections are in contact in coupled position, the length of the inner surface of said sleeve between said grooves being at least about one-seventh and not more than about six-sevenths of the length of the sleeve, and said grooves and ridges having a pitch angle greater than 30°.

2. A coupling as defined in claim 1 in which the grooves and ridges each extends less than 360° around the circumference of the sleeve and the rod sections.

3. A coupling as defined in claim 1 in which the grooves extend completely through the wall of the sleeve.

4. A coupling as defined in claim 1 in which rod sections are cylindrical.

References Cited in the file of this patent
UNITED STATES PATENTS

| | | |
|---|---|---|
| 149,728 | Diehl | Apr. 4, 1874 |
| 1,080,674 | Berg | Dec. 9, 1913 |
| 1,335,521 | Murphy | Mar. 30, 1920 |
| 1,591,871 | Heinrich | July 6, 1926 |
| 1,733,392 | Barra | Oct. 29, 1929 |
| 1,800,998 | Hansen | Apr. 14, 1931 |
| 1,970,673 | Rea | Aug. 21, 1934 |